B. J. FIELD.
Attaching Artificial Teeth to Dental Plates.
No. 156,458.  Patented Nov. 3, 1874.
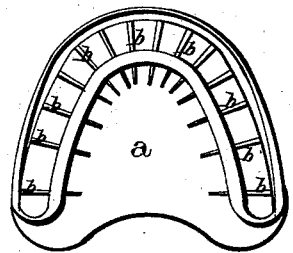
Fig. 1.
  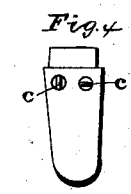 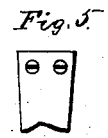 
Fig. 2.  Fig. 3.  Fig. 4.  Fig. 5.  Fig. 6.
Fig. 7.
WITNESSES.
J. Wm Garner,
T. F. Lehmann
INVENTOR.
B. J. Field
per
F. A. Lehmann, Atty.

UNITED STATES PATENT OFFICE.

BENTON J. FIELD, OF LEAKSVILLE, NORTH CAROLINA.

IMPROVEMENT IN ATTACHING ARTIFICIAL TEETH TO DENTAL PLATES.

Specification forming part of Letters Patent No. 156,458, dated November 3, 1874; application filed October 27, 1874.

*To all whom it may concern:*

Be it known that I, BENTON JEREMY FIELD, of Leaksville, in the county of Rockingham and State of North Carolina, have invented certain new and useful Improvements in Attaching Artificial Teeth to their Plates; and I do hereby declare the following to be a full, clear, and exact description of the invention, such as will enable others skilled in the art to which it pertains to make and use it, reference being had to the accompanying drawings, which form part of this specification.

My invention relates to an improved method of attaching artificial teeth to their plates; and it consists in forming a base-plate in the usual way, upon which the teeth are fitted, so as to get their precise shape and position. The teeth are first carefully separated from this plate, and then flat pins are passed through it, so as to preserve the holes made by the flat-headed pins attached to the teeth; and from this plate a mold is formed, in which the permanent plate is baked, or otherwise made, while entirely separate from and independent of the teeth. The small holes through it are enlarged at their inner ends to a suitable distance inward, so as to meet the flat-headed pins attached to the teeth, which pins are to be inserted in the oblong holes made by the flat pins. A suitable instrument is then inserted into the enlarged part of the holes, the heads of the pins turned around until they are at a right angle to the hole through which they were inserted, when they form a perfect key or locking device for retaining the teeth rigidly in position. Heretofore vulcanite and other such plates have first had the teeth attached to them, and then the two were baked together, whereby the teeth were secured in position. In case it became necessary to remove one of these teeth, great trouble and injury to the plate are necessary, and in case the plate cooled too rapidly or unevenly, the teeth are sure to be broken. By my manner of securing the teeth, by means of a key, each one or set can be removed and replaced as often as may be necessary, and require but a few moments each time.

Figure 1 is a plan view of the base-plate, showing the flat pins. Figs. 2, 3, 4, 5, 6 are detail views, showing the manner of attaching the teeth to the permanent plate; and Fig. 7 is a view of the instrument by which the heads are turned around.

A base-plate, $a$, of wax or other material, is first formed, upon which the teeth are accurately fitted in position, after which they are carefully separated; and then the flat pins $b$ are passed through this plate, as shown in Fig. 1, so as to preserve the holes made by the flat-headed pins while the permanent plate is being made. From this base-plate a suitable mold is formed, in which the permanent plate is made. The plate is then baked, or otherwise made, in the usual manner, but entirely separate and independent of the teeth, which are to be secured in position afterward. To each tooth are secured one or more small, flat-headed pins, $c$, of any suitable metal, which will correspond to one of the holes made through the plate by the flat pins $b$. These pins $c$ are long enough to extend only partially through the plate, as shown in Fig. 6, when the teeth are placed in position. A small drill is then taken, and the end of each one of the holes enlarged inward to a sufficient distance to a little more than meet these flat-headed pins, which are inserted from the opposite sides, when an instrument, such as is shown in Fig. 7, or of any other suitable construction, is passed in at the enlarged end of the hole, so as to catch over the head of the pin, and the head turned around at such an angle to the oblong holes through which it was inserted that it cannot be again drawn out until the head is again turned to its original position. By means of this locking-pin the teeth can be readily and quickly removed from the plate any number of times, and then replaced again, without the slightest injury to the plate. After the teeth have all been placed in position, the enlarged ends of the holes may be filled by means of a gold plug, or any other suitable substance.

By means of a locking device or key I get rid not only of baking the teeth with the plate, but of the great trouble and amount of time which are required to remove one of the teeth secured to the plate by baking, should they get injured; and am enabled to remove and replace each tooth as often as may be necessary, in a few moments of time.

I claim as my invention—

Uniting teeth to a dental plate by means of the flat-headed pins, which are inserted in the orifices of the plate, and then turned partially around, substantially as set forth.

In testimony that I claim the foregoing I have hereunto set my hand this 27th day of October, 1874.

BENTON J. FIELD.

Witnesses:
 FRANK CLAUDY,
 T. F. LEHMANN.